(12) United States Patent
Lindsey et al.

(10) Patent No.: US 12,401,220 B1
(45) Date of Patent: *Aug. 26, 2025

(54) CONTROLLERS, AND ASSOCIATED CIRCUITRY, DEVICES, SYSTEMS, MOBILE UNITS, AND METHODS

(71) Applicant: LiveView Technologies, LLC, American Fork, UT (US)

(72) Inventors: Richard C. Lindsey, Payson, UT (US); Chris E. Spencer, Riverton, UT (US)

(73) Assignee: LiveView Technologies, LLC, American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/986,456

(22) Filed: Dec. 18, 2024

Related U.S. Application Data

(63) Continuation of application No. 18/765,823, filed on Jul. 8, 2024, now Pat. No. 12,237,712.

(51) Int. Cl.
  *H02J 9/06* (2006.01)
  *G06F 1/30* (2006.01)

(52) U.S. Cl.
  CPC . *H02J 9/06* (2013.01); *G06F 1/30* (2013.01)

(58) Field of Classification Search
  CPC ................................... H02J 9/06; G06F 1/30
  USPC .......................................................... 361/79
  See application file for complete search history.

(56) References Cited

U.S. PATENT DOCUMENTS

| | | |
|---|---|---|
| 4,390,142 A | 6/1983 | Cheng |
| 5,086,453 A | 2/1992 | Senoo et al. |
| 5,708,350 A | 1/1998 | Tibbs |
| 7,508,171 B2 | 3/2009 | Carrier et al. |
| 7,528,572 B2 * | 5/2009 | Masias ............... H02J 7/007 320/110 |
| 7,745,040 B2 | 6/2010 | Chang et al. |

(Continued)

FOREIGN PATENT DOCUMENTS

| | | | |
|---|---|---|---|
| CN | 205588922 U | * | 9/2016 |
| JP | 2018191458 A | * | 11/2018 |

(Continued)

OTHER PUBLICATIONS

Lindsey, Richard C., Power Reset, and Associated Circuitry, Devices, Systems, Mobile Units, and Methods, filed Oct. 29, 2024, U.S. Appl. No. 18/930,666, 26 pages.

*Primary Examiner* — Dharti H Patel

(74) *Attorney, Agent, or Firm* — TraskBritt

(57) ABSTRACT

Various embodiments relate to mobile units. A mobile unit may include a number of electronic devices including a processor, a number of loads, and a modem. The mobile unit may further include a circuit board including the processor and logic configured to reset the processor, at least one load of the number of loads, and/or the modem responsive to receipt of a reset signal. The circuit board may also include a power switch-over circuit coupled to the processor and the logic and configured to switch power to at least some of the number of electronic devices from a primary battery to a secondary battery or from the secondary battery to the primary battery. Further, the circuit board may include a charge controller coupled to the secondary battery and configured to limit an amount of current conveyed to the secondary battery. Associated devices and methods are also disclosed.

20 Claims, 12 Drawing Sheets

(56) References Cited

U.S. PATENT DOCUMENTS

| | | | |
|---|---|---|---|
| 7,774,633 | B1 | 8/2010 | Harrenstien et al. |
| 9,746,893 | B1* | 8/2017 | Sizikov ............... G06F 1/28 |
| 9,997,957 | B2* | 6/2018 | Chapel ............... H02J 9/061 |
| 10,103,412 | B2 | 10/2018 | Li |
| 11,075,533 | B2 | 7/2021 | Takahashi et al. |
| 11,662,788 | B1* | 5/2023 | Lindsey ......... G08B 13/19632 713/1 |
| 2002/0111756 | A1* | 8/2002 | Modgil ............... B60R 25/04 702/63 |
| 2004/0136388 | A1 | 7/2004 | Schaff |
| 2005/0132237 | A1 | 6/2005 | Barsuk |
| 2005/0253561 | A1 | 11/2005 | Tibbs |
| 2006/0259933 | A1 | 11/2006 | Fishel et al. |
| 2009/0013210 | A1 | 1/2009 | McIntosh et al. |
| 2010/0090652 | A1 | 4/2010 | Takeda et al. |
| 2011/0153240 | A1* | 6/2011 | Benckenstein, Jr. ........ G01R 31/3832 324/427 |
| 2011/0320830 | A1 | 12/2011 | Ito |
| 2012/0092504 | A1 | 4/2012 | Murphy et al. |
| 2012/0278601 | A1 | 11/2012 | Chang |
| 2013/0185547 | A1 | 7/2013 | Sturdivant et al. |
| 2014/0055094 | A1 | 2/2014 | Takagi et al. |
| 2014/0176046 | A1* | 6/2014 | Park ............... H02J 7/00304 320/136 |
| 2014/0184159 | A1 | 7/2014 | Kachi |
| 2014/0207635 | A1* | 7/2014 | Pappas ............... G07C 1/10 705/32 |
| 2015/0067312 | A1 | 3/2015 | Lewandowski et al. |
| 2016/0026192 | A1 | 1/2016 | Phillips et al. |
| 2016/0164831 | A1 | 6/2016 | Kim |
| 2016/0181936 | A1 | 6/2016 | Ailenei |
| 2016/0218555 | A1* | 7/2016 | Slaby ............... H02J 7/34 |
| 2016/0218556 | A1* | 7/2016 | Slaby ............... H02J 9/06 |
| 2016/0232764 | A1 | 8/2016 | Galvin et al. |
| 2016/0234785 | A1* | 8/2016 | Gupta ............... H04W 52/0296 |
| 2016/0358435 | A1 | 12/2016 | Lee |
| 2017/0025843 | A1 | 1/2017 | Liu et al. |
| 2017/0063150 | A1 | 3/2017 | Sakamoto et al. |
| 2018/0074562 | A1 | 3/2018 | Lampe et al. |
| 2018/0159345 | A1 | 6/2018 | Lin |
| 2018/0320835 | A1 | 11/2018 | Poage |
| 2018/0348848 | A1 | 12/2018 | Bower et al. |
| 2019/0042418 | A1 | 2/2019 | Dutta et al. |
| 2019/0078347 | A1 | 3/2019 | Gharabegian |
| 2020/0033932 | A1 | 1/2020 | Sachs et al. |
| 2020/0052499 | A1 | 2/2020 | Takahashi et al. |
| 2020/0303947 | A1* | 9/2020 | Ives ............... H02J 3/32 |
| 2021/0037041 | A1 | 2/2021 | Ree |
| 2021/0151270 | A1 | 5/2021 | King et al. |
| 2021/0257826 | A1* | 8/2021 | Trumbo ............... H02H 1/0007 |
| 2021/0368142 | A1 | 11/2021 | Phillips et al. |
| 2022/0109309 | A1 | 4/2022 | Liu et al. |
| 2022/0169236 | A1* | 6/2022 | Han ............... B60L 53/20 |
| 2022/0187900 | A1* | 6/2022 | Bhanutej ............... G06F 1/30 |
| 2022/0334846 | A1 | 10/2022 | Doi et al. |
| 2023/0066436 | A1* | 3/2023 | Rutkowski ......... H02M 1/0009 |
| 2023/0283163 | A1* | 9/2023 | Rutkowski ............... H02M 3/06 363/17 |
| 2023/0318327 | A1* | 10/2023 | Tong ............... G06F 3/03545 345/179 |
| 2023/0388648 | A1* | 11/2023 | Park ............... H04N 25/704 |
| 2024/0008777 | A1* | 1/2024 | Fuchs ............... A61B 5/1473 |
| 2024/0113533 | A1* | 4/2024 | Lindsey ............... H02J 7/0047 |

FOREIGN PATENT DOCUMENTS

| | | | |
|---|---|---|---|
| WO | WO-2020251694 A1 * | 12/2020 | ............ G06F 1/26 |
| WO | WO-2024039467 A1 * | 2/2024 | ............ H02J 7/0048 |

* cited by examiner

CONTROLLERS, AND ASSOCIATED CIRCUITRY, DEVICES, SYSTEMS, MOBILE UNITS, AND METHODS

CROSS-REFERENCE TO RELATED APPLICATIONS

This application is a continuation of U.S. patent application Ser. No. 18/765,823, filed Jul. 8, 2024, now U.S. Pat. No. 12,237,712, issued Feb. 25, 2025, the disclosure of each of which is hereby incorporated herein in its entirety by this reference.

TECHNICAL FIELD

This disclosure relates generally to controllers and, more specifically, to edge control boards, and to related circuitry, devices, systems, security and/or surveillance units, and methods.

BACKGROUND

Edge computing refers to processing, analyzing, and storing data closer to where the data is generated (i.e., on the "edge" instead of at a centralized location, such as a cloud server) to enable rapid, near real-time analysis, and response.

In a surveillance and/or security example, a mobile unit, which may include a number of edge devices, may be positioned at the "edge." Edge devices may include, for example, a controller, sensors, communication devices, I/O devices, without limitation. A controller (e.g., an "edge controller"), which may enable communication between edge devices (e.g., sensors, I/O devices, etc.) and remote devices (e.g., a server (e.g., cloud server) and/or a user device), may monitor and/or manage the health of edge devices, process captured or sensed data, and/or enable data to be sent to, for example, a remote device (e.g., a server and/or a user device).

BRIEF SUMMARY

At least one embodiment of the disclosure includes a mobile unit. The mobile unit may include a number of electronic devices including a processor, a number of loads, and a modem. Further, the mobile unit may include a circuit board including the processor and power reset logic. The power reset logic may be configured to reset the processor, at least one load of the number of loads, and/or the modem responsive to receipt of a reset signal. The circuit board may also include a power switch-over circuit coupled to the processor and the power reset logic. The power switch-over circuit may be configured to switch power to at least some of the number of electronic devices from a primary battery to a secondary battery or from the secondary battery to the primary battery. Further, the circuit board may include a charge controller coupled to the secondary battery and configured to limit an amount of current conveyed to the secondary battery.

Another embodiment includes a mobile device. The mobile device may include a circuit board for coupling to a first battery, a second battery, a modem, and a number of peripheral devices. The circuit board may include a processor and power reset logic. The power reset logic may be configured to reset, responsive to receipt of a signal from a modem, the processor and/or at least one peripheral device of the number of peripheral devices. The circuit board may further include a power switch-over unit configured to switch power to the number of peripheral devices from the first battery to the second battery. Further, the circuit board may include a charge controller coupled to the secondary battery and configured to limit an amount of current conveyed to the secondary battery.

Other embodiments may include a mobile unit. The mobile unit may include a trailer and a storage unit coupled to the trailer and including a primary battery. The mobile unit may also include a mast coupled to the trailer and a head unit coupled to the mast and at least one load of a number of loads. The head unit may include a secondary battery, a modem, and a control board. The control board may include power reset logic configured to reset a processor, a load of the number of loads, and/or the modem responsive to receipt of a reset signal. The control board may also include a power switch-over circuit coupled to the processor and the power reset logic and configured to switch power to at least some of the number of loads from the primary battery to the secondary battery or from the secondary battery to the primary battery. The control board may further include a charge controller coupled to the secondary battery and configured to limit an amount of current conveyed to the secondary battery.

Another embodiment includes a method of operating a mobile unit. The method may include resetting one or more components of a mobile unit responsive to receipt of a reset signal. The method may further include switching a power source from a first battery to a second battery, wherein the power source supplies power to at least one component of the number of components. The method may also include limiting an amount of current supplied to the secondary battery from the first battery. In addition, the method may include sensing at least one property associated with a component of the number of components.

DETAILED DESCRIPTION

Figure 1A:
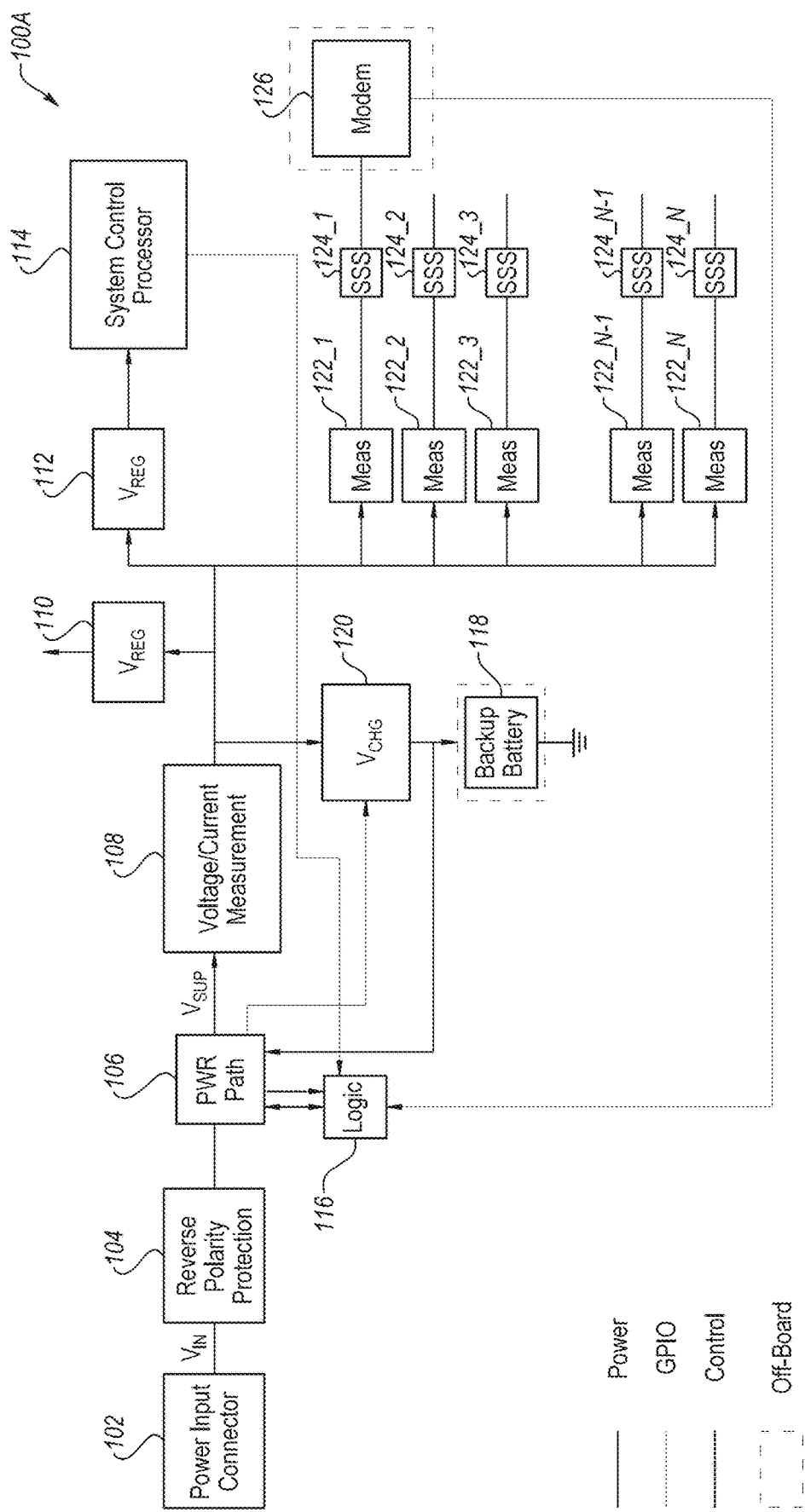
FIG. 1A depicts an example system, according to various embodiments of the disclosure.

Referring in general to the accompanying drawings, various embodiments of the present disclosure are illustrated to show example embodiments related to control circuitry for remote devices. It should be understood that the drawings presented are not meant to be illustrative of actual views of any particular portion of an actual circuit, device, system, or structure, but are merely representations which are employed to more clearly depict various embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

As will be appreciated, an electronic device may occasionally stop working (e.g., "freeze" or "hang") and may need to be rebooted by disconnecting and reconnecting (also referred to herein as "toggling") power to the electronic device. As will also be appreciated, in some systems, an electronic device may be remote from other devices (e.g., server and/or a user device) of the system. As a more specific, non-limiting example, a remote unit (e.g., a "mobile unit" or "remote device"), which may include one or more input devices (e.g., sensors, cameras, etc.), one or more output devices (e.g., lights, speakers, etc.), a communication device, a storage device, and/or a controller may be positioned at a first location, and a server and/or one user devices may be positioned at another location, which is remote from the first location. In these and other examples, a remote system (e.g., a mobile unit) may include various devices (e.g., a processor, I/O device, a switch, sensor, modem, without limitation) that may become unstable at times and may freeze or lock-up due to power transients inherent in the system or even bugs in the software.

In some conventional systems, when a device of a remote unit (e.g., a mobile, remote unit) fails or otherwise stops working, a technician is dispatched from a location nearest to, but remote from, that of the remote unit. The technician, after traveling to (e.g., via a vehicle) and arriving at the location of the remote unit, manually disconnects power to the device. After a few seconds, the technician powers the device back on to reset the device. This is not only expensive but may take several days before the remote unit can be reached and the device is restored to full operation. As will be appreciated, downtime of a remote unit is very costly (e.g., to a business due to clients/customers not paying for associated products/services during downtime).

According to some embodiments, a remote unit, which may include and/or may be referred to herein as a "mobile unit" or a "mobile device," may include components (e.g., circuitry) that enable a processor or other associated equipment and peripherals to be power cycled or otherwise rebooted (e.g., remotely), either individually or collectively. Thus, as will be appreciated by persons having ordinary skill in the art, in contrast to conventional systems, devices, circuitry, and methods, which require a user to travel to a remote location of a remote unit (e.g., a mobile unit) to manually reset one or more components of a unit, various embodiments may enable a user to remotely reset a device (e.g., a controller or other load (e.g., modem, sensor, switch, without limitation)). Thus, as will be appreciated by a person having ordinary skill in the art, various embodiments may save time and may reduce costs associated with a remote unit. Further, various embodiments may increase uptime of a remote unit.

In addition, as described more fully below, a remote unit may include circuitry for enabling intentional shut down of certain non-essential devices (e.g., during times when power levels are low due to the lack of energy from the main power source in order to extend autonomy as long as possible). Power switchover circuitry (e.g., to switch from main to backup automatically or manually in response to a command) may also be included in a remote unit, according to various embodiments described more fully below.

Further, when operating a remote unit (e.g., including a number of electronic devices) in a remote location (e.g., away from the power grid) when a primary energy source is solar, wind, geothermal, or other so called renewable energy systems that are mostly intermittent in nature, power autonomy is of utmost importance. In these scenarios, a primary power system (e.g., including a primary battery system) may be used to maintain autonomy as long as possible during times when the renewable energy source is unavailable or at a reduced capacity (e.g., sun is obscure or the wind is not blowing, etc.). According to various embodiments, if a main battery bank runs down or is otherwise disrupted (e.g., due to vandalism or other problems), a secondary battery system may provide power to extend system operation for an additional time (e.g., to allow for data to be collected about how, when and why the power was interrupted and corrective action can be taken) until the primary power system is restored.

According to various embodiments of the disclosure, a secondary power system may include a rechargeable battery that may include its own charge control and monitoring system independent of the main power system. The rechargeable battery may be maintained in a high or full state of charge (SOC) (e.g., as much as possible) while the main power system is running while minimizing the drain on the ability of the main power system to charge and maintain one or more batteries of the primary power system in a high or full SOC.

Moreover, a remote unit, according to various embodiments, may include circuitry for control functions (e.g., analog and digital inputs, switched control outputs, system power health monitoring, external environmental sensors, reverse polarity and ESD protection, without limitation). The circuitry may further include measurement devices to monitor and report statuses of various devices (e.g., loads) of the remote unit. In some embodiments, a current limiter for backup battery and an associated buck/boost charger controller may also be included.

According to some embodiments, circuitry of a remote unit may be configured for performing all necessary functions (i.e., rather than requiring individualized pieces) of a unit (e.g., a surveillance/security unit, such as mobile surveillance/security unit). According to various embodiments of the disclosure, a single device (e.g., a single control device ("edge controller")), which may be part of a single circuit board (e.g., a PCB), may include control functionality, edge power reset functionality, power switchover functionality, current limiting functionality, and health monitoring (e.g., via V/I sense) functionality. A single circuit board including necessary functionality may decrease power consumption and system costs and may increase reliability of a remote unit. As will be appreciated, off the shelf devices may not perform all required functions, and thus, conventional remote units require extra devices that increase price and power consumption. Further, compared to conventional devices, various embodiments including a single control board may be more compact and thus require less space compared to remote units including off-the-shelf equipment.

Accordingly, various embodiments are directed to a single control unit, which is not only configured for normal control functions such as analog and digital inputs, switched control outputs, system power health monitoring, external environmental sensors, reverse polarity and ESD protection, without limitation, but also provides for remote power reset of, for example, a central processor as well as any other device of the remote unit, either individually or collectively. Further, the control unit may be configured such that a power source may be changed from one source (e.g., a main source) to another source (e.g., a backup source) quickly (e.g., in milliseconds), whether automatically or manually responsive to a command generated, for example, from a remote location either via, for example, cellular communication or other suitable wireless communication.

Further, a backup battery system of a unit may include a charge current limiter that may be adjustable depending on the state of charge (SOC) of a main battery in order to minimize power drain at times when the main power source (e.g., solar, wind, etc.) is, for example, at or near its minimum capacity. Moreover, a charge controller (e.g., a buck/boost charge controller), which may be configured to provide the limiter functionality, may include an enable line (i.e., to turn the charge controller on or off as needed) and a charge current selection signal (i.e., to set the current to the desired level as conditions dictate). According to some embodiments, control may be carried out via, for example, software, which may be manually overridden when needed.

A unit may also include a number of switched outputs that control power to individual peripheral device "loads," each of which including and/or being coupled to a measurement device (e.g., a voltage and/or current measurement device) that senses parameters and report back to a processor that may continuously monitor and analyze the status of an associated load. The status may also be reported to, for example, a remote location (e.g., a server, such as a cloud server, and/or another device). Other various embodiments are related to methods of power-cycling individual peripherals of a unit, if needed.

Although various embodiments are described herein with reference to security and/or surveillance systems and/or mobile security and/or mobile surveillance units, the present disclosure is not so limited, and the embodiments may be generally applicable to any system and/or device that may or may not include security and/or surveillance systems and/or units. Further, although some embodiments are disclosed with reference to a mobile unit, the disclosure is not so limited, and a person having ordinary skill will understand that various embodiments may be applicable to stationary units (e.g., stationary security/surveillance devices), such as a unit coupled to a stationary pole (e.g., a light pole), a structure (e.g., of a business or a residence), a tree, etc. Embodiments of the disclosure will now be explained with reference to the accompanying drawings.

FIG. 1A illustrates an example system 100A, in accordance with various embodiments of the disclosure. Power system 100A, which may be part of a controller (e.g., an "edge controller"), includes a power input connector 102, a reverse polarity protection unit 104, a power path controller 106, a measurement unit (e.g., a voltage/current measurement unit) 108, a voltage regulator 110, a voltage regulator 112, a processor 114, power reset logic 116, a backup power supply (e.g., a backup battery) 118, a charger 120, a number of measurement units 122 (e.g., units 122_1-122_N), a number of switches (e.g., solid-state switches) 124 (e.g., switches 124_1-124_N), each of which being configured to couple to a load (e.g., a strobe, a speaker, a camera, a light, without limitation), and a modem 126. For example, each measurement unit 122 may include a voltage/current measurement unit (i.e., for sensing a voltage and/or a current associated with a corresponding load).

According to at least some embodiments, at least some components of system 100A may be on (i.e., part of) a single circuit board (e.g., a single PCB). More specifically, in one example, at least power input connector 102, reverse polarity protection unit 104, power path controller 106, measurement unit 108, voltage regulators 110 and 112, processor 114, power reset logic 116, charger 120, measurement units 122, and switches (e.g., solid-state switches) 124 may be onboard components (e.g., on a single circuit board). In this example, backup battery 118 and modem 126 may be offboard components. Further, in one non-limiting example, voltage regulator 110 may include a 3.3 V regulator and voltage regulator 112 may include a 5.0 V regulator.

Figure 1B:
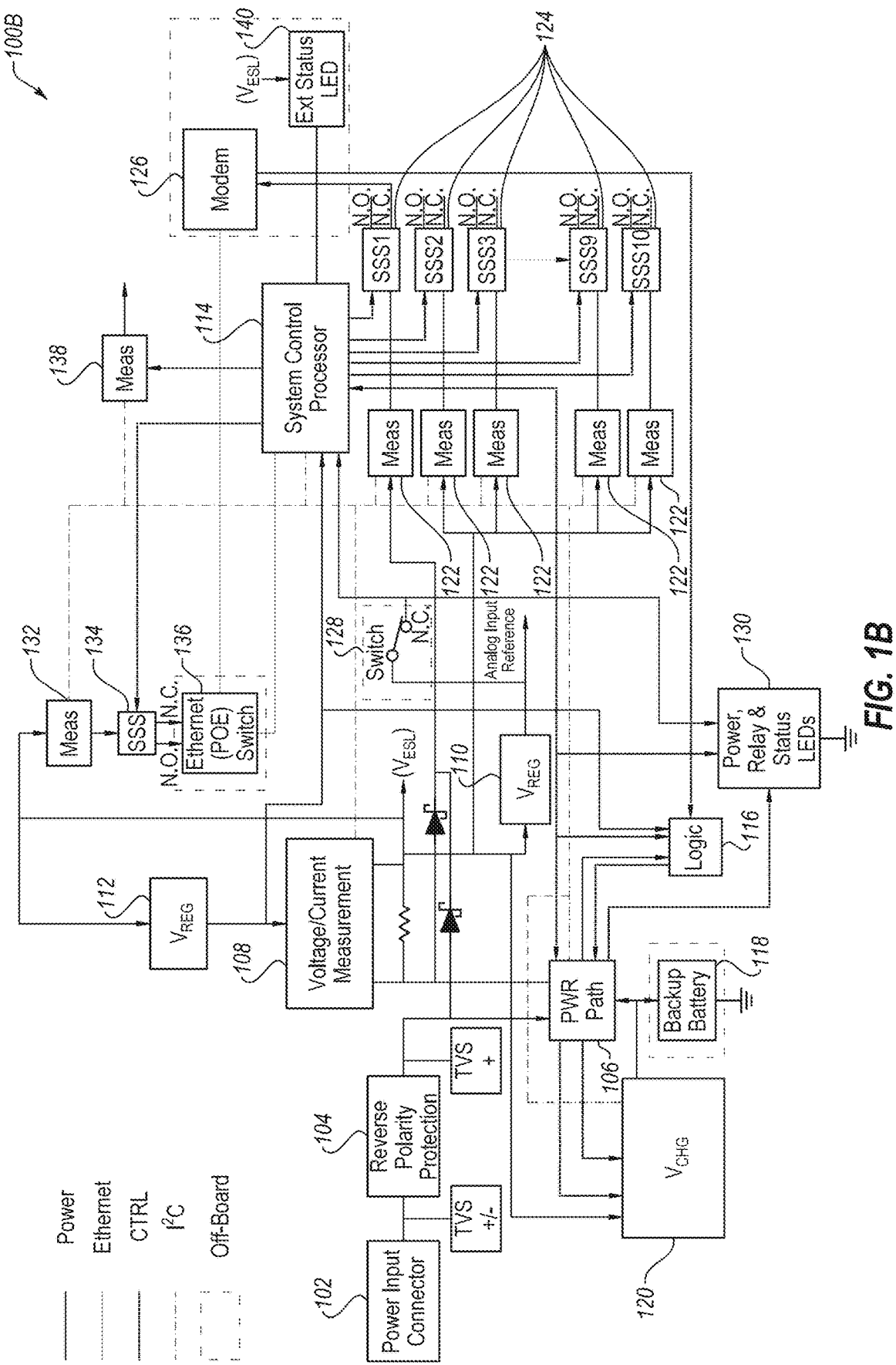
FIG. 1B is a more detailed illustration of an example system, in accordance with various embodiments of the disclosure.

FIG. 1B is a more detailed illustration of a system 100B, according to various embodiments of the disclosure. For example, system 100A of FIG. 1A may include and/or be part of system 100B of FIG. 1B. In addition to various components of system 100A, power system 100B includes a switch 128, LEDs (e.g., power, relay, and/or status LEDs) 130, V/I measurement unit 132, a switch (e.g., solid-state switches) 134, a switch (e.g., Ethernet (POE) switch) 136, a V/I measurement unit 138, and a LED 140.

Similar to system 100A, at least some components of system 100B may be on a single circuit board. For example, other than backup battery 118, modem 126, LED 140, and switch 128, which may be offboard components, components of system 100B may be onboard components (e.g., on a single circuit board).

According to various embodiments, a component of a power system (e.g., power system 100A and/or power system 100B) may be coupled to one or more other components (e.g., of the power system) via a power connection, a general-purpose input/output (GPIO) connection, a control connection, an Ethernet connection, an I2C connection, another connection, or any combination thereof.

For example, with reference to FIGS. 1A and 1B, each of power input connector 102, reverse polarity protection unit 104, power path controller 106, measurement unit 108, voltage regulators 110 and 112, processor 114, power reset logic 116, measurement units 122, and switches 124 may be coupled to one or more other components via a power connection (e.g., for supplying voltage and/or current signals). Further, power reset logic 116 may be coupled to processor 114 via a control (e.g., GPIO) connection and power path controller 106 via a control connection. Power path controller 106 may be coupled to charger 120 via a control connection and power reset logic 116 via a power and/or control connection. As another example, with reference to FIG. 1B, switch 136 may be coupled to processor 114 via an Ethernet connection and modem 126 via an Ethernet connection. Further, for example, V/I measurement unit 132 may be coupled to V/I measurement unit 138, measurement units 122, power path controller 106, and charger 120 via an I2C connection. Further, processor 114 may be coupled to various components (e.g., switches 124 and 134, power path controller 106, power reset logic 116, and possibly other components), via a control connection.

For example, according to various embodiments, power input connector 102 may be configured to provide an input voltage to reverse polarity protection unit 104, which may be configured to provide a voltage +V1 to power path controller 106. Further, power path controller 106 may be configured to provide a voltage VSUP to measurement unit 108, which may provide a DC voltage (e.g., 24 V) to voltage regulator 110, voltage regulator 112, charger 120, and each of measurement units 122. Each measurement unit 122 may provide a voltage and/or a current to an associated switch 124. Voltage regulator 112 may provide a voltage (e.g., 3.3 V) to processor 114 and charger 120 may provide a voltage (e.g., 25.3 V and 1 or 2 amps) to each of backup battery 118 and power path controller 106. Voltage regulator 112 may be configured to convey a voltage (e.g., 5 V). Moreover, modem 126 may be configured to provide a control signal (e.g., a GPIO signal) to power reset logic 116, processor 114 may be configured to provide a control signal (e.g., a GPIO signal) to power reset logic 116, and power path controller 106 may be configured to provide a control signal (e.g., a GPIO signal) to charger 120.

Figure 2:
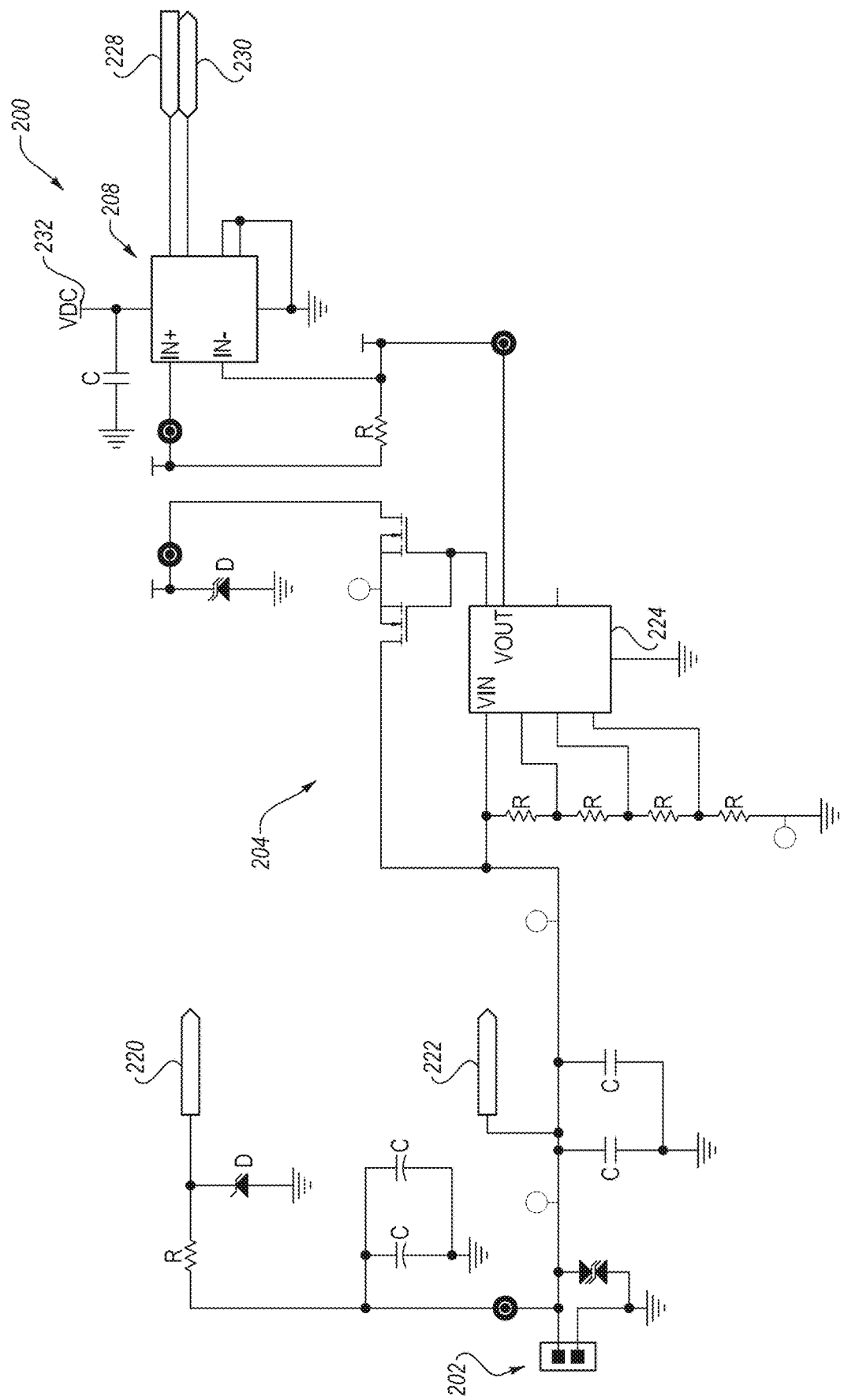
FIG. 2 is a circuit diagram of an example power supply, according to various embodiments of the disclosure.

FIG. 2 illustrates an example power supply 200, according to various embodiments of the disclosure. Power supply 200 includes a power input connector 202, a reverse polarity protection unit 204, and a measurement unit 208. For example, power input connector 102 of FIG. 1A may include power input connector 202, reverse polarity protection unit 104 of FIG. 1A may include reverse polarity protection unit 204, and measurement unit 108 of FIG. 1A may include measurement unit 208. Power supply 200 further includes voltage inputs 220 and 222, a protection controller 224, a clock port 228, a data port 230, and a supply voltage 232, which may include, for example, 3.3 VDC.

Figure 3:
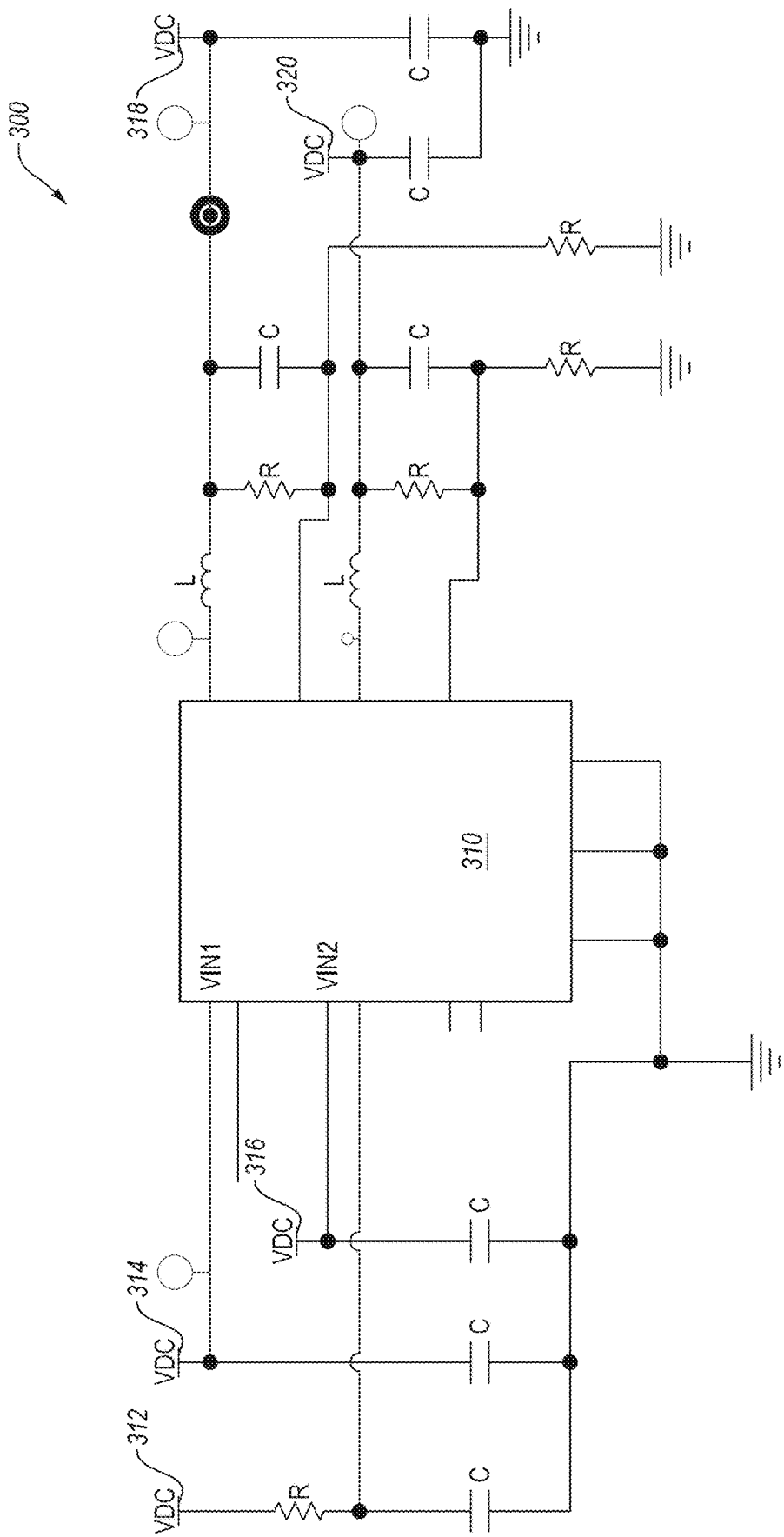
FIG. 3 is a circuit diagram of an example voltage regulator, in accordance with various embodiments of the disclosure.
Figure 4:
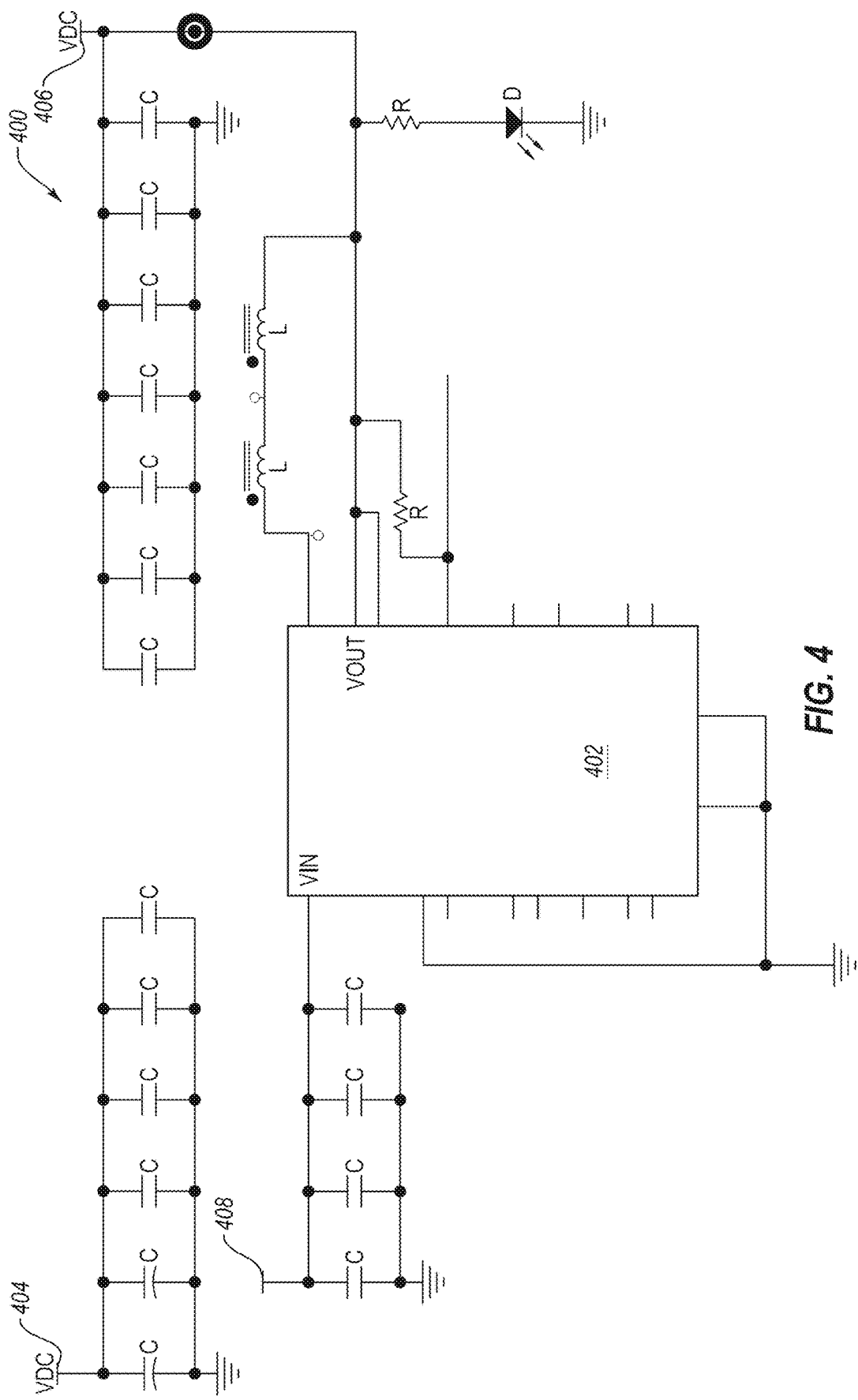
FIG. 4 is a circuit diagram of another example voltage regulator, according to various embodiments of the disclosure.

FIGS. 3 and 4 depict a voltage regulator 300 and a voltage regulator 400, respectively. In one example, voltage regulator 112 of FIGS. 1A and 1B may include voltage regulator 300, and voltage regulator 110 of FIGS. 1A and 1B may include voltage regulator 400. Further, in some examples, voltage regulator 300 may include a 3.3 V and/or 1.8 V voltage regulator and voltage regulator 400 may include a 5.0 V voltage regulator.

As illustrated in FIG. 3, voltage regulator 300 includes a switching regulator 310 and supply voltages 312 (e.g., 3.3 VDC), 314 (e.g., 5 VDC), and 316 (e.g., 5 VDC). Further, voltage regulator 300 includes voltage output 318 (e.g., 3.3 V output) (e.g., for feeding supply voltage 312) and a voltage output 320 (e.g., 1.8 V output). Further, as illustrated in FIG. 4, voltage regulator 400 includes switching regulator 402 and a supply voltage 404 (e.g., a 24 V input). Voltage regulator 400 further includes a voltage output 406 (e.g., 5 V output), which may be coupled to supply voltage 314 of FIG. 3. It is noted that the capacitor bank coupled to supply voltage 404 may include or be part of the capacitor bank coupled to supply voltage 408, and in this example, supply voltage 408 may be supply voltage 404 (i.e., supply voltage 408 and supply voltage 404 may be the same supply voltage).

Figure 5:
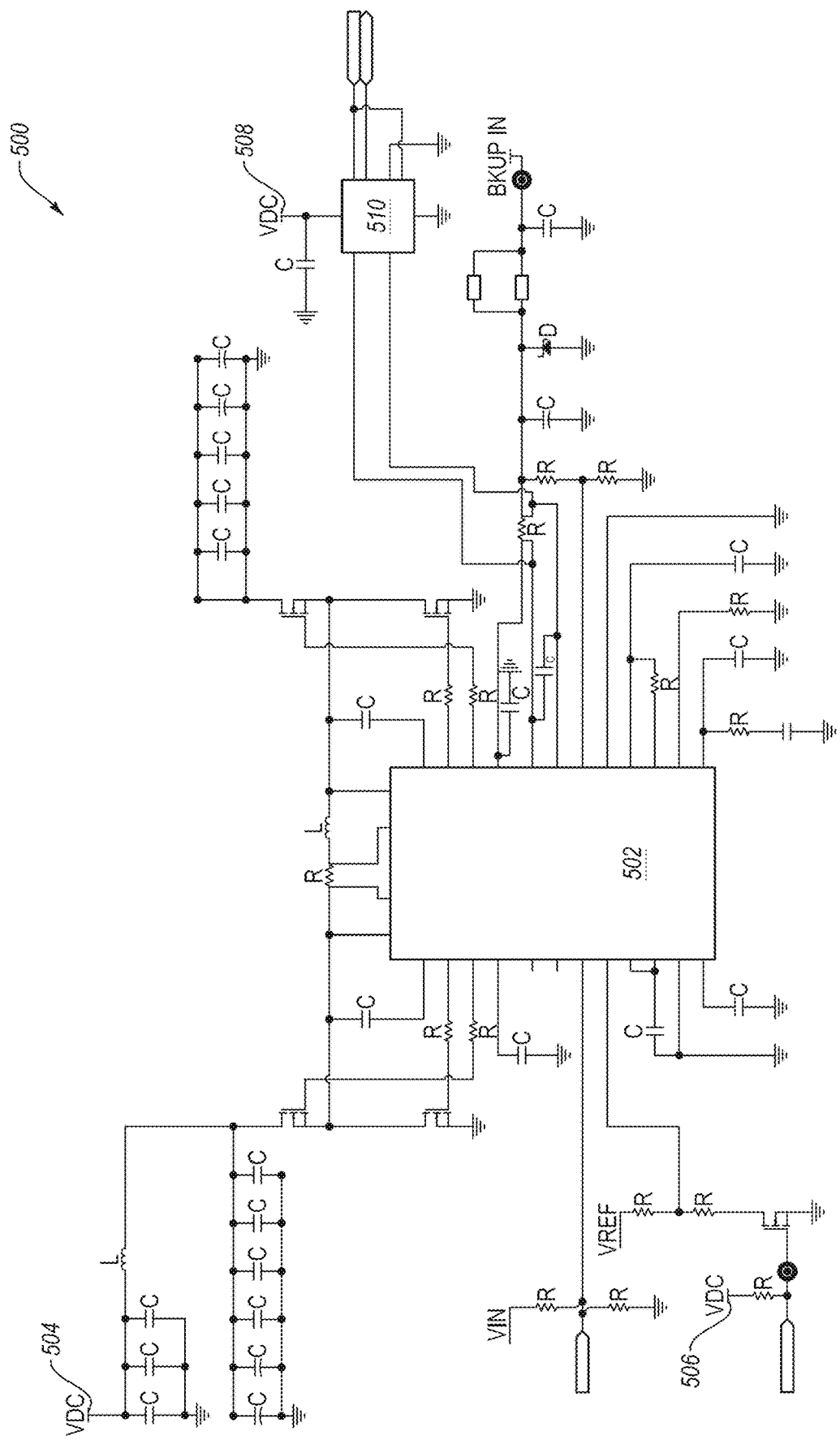
FIG. 5 is a circuit diagram of an example charger, according to various embodiments of the disclosure.

FIG. 5 depicts an example charger 500, according to various embodiments of the disclosure. For example, charger 120 of FIG. 1 may include charger 500, which may include, for example, a battery charger. Charger 500 includes a buck-boost controller 502, supply voltages 504 (e.g., 24 VDC), 506 (e.g., 3.3 VDC), 508 (e.g., 3.3 VDC), input voltage BKUP IN (e.g., from a backup battery), input voltage VIN (e.g., from a main battery), and a power monitor 510. It is noted that a voltage on the right end of the inductor coupled to supply voltage 504 may be substantially equal to input voltage VIN.

Figure 6:
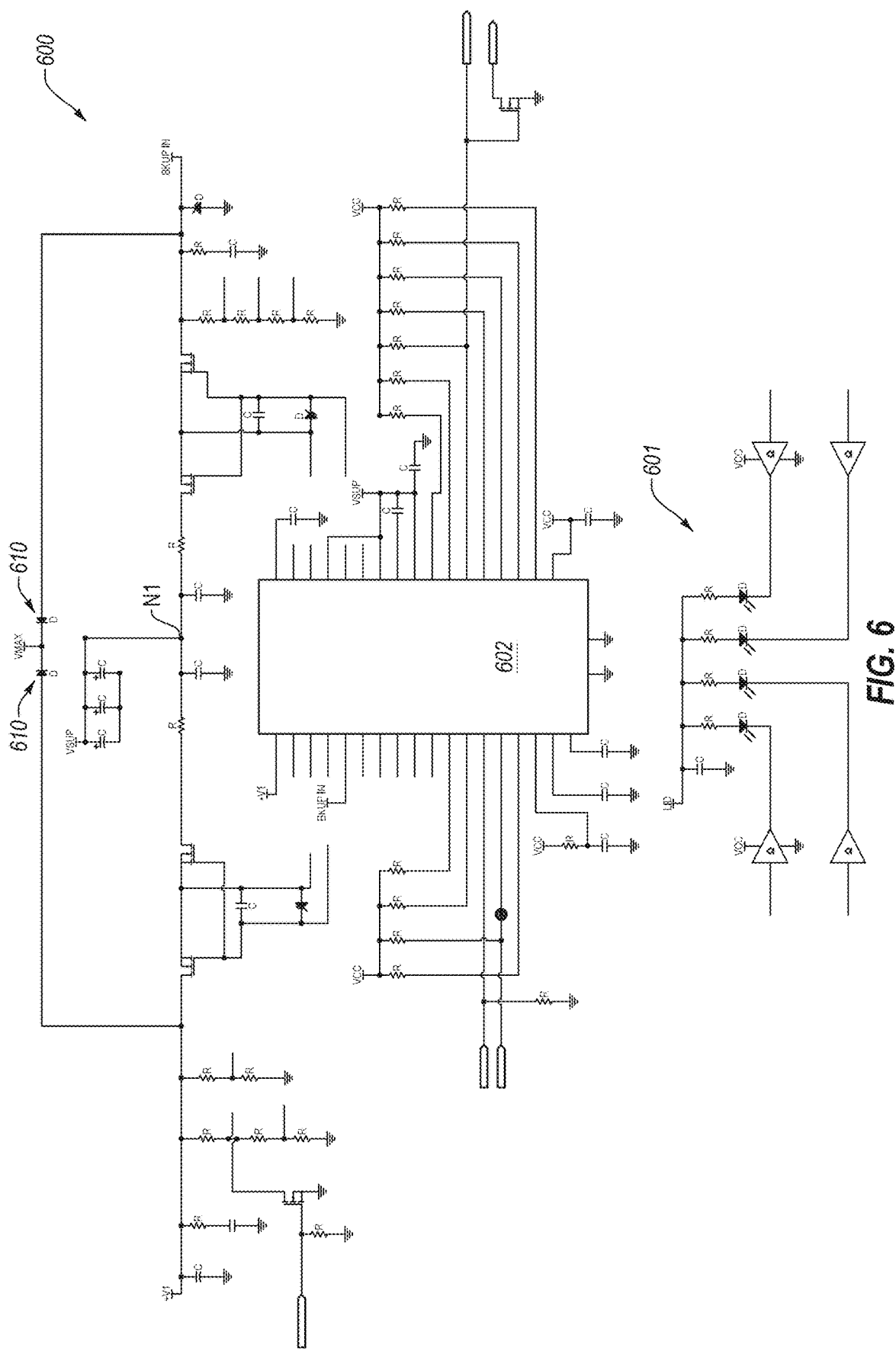
FIG. 6 is a circuit diagram of an example power path controller, according to various embodiments of the disclosure.

FIG. 6 depicts an example power path controller 600, in accordance with various embodiments of the disclosure. For example, power path controller 106 of FIG. 1 may include power path controller 600. Power path controller 600 includes status LEDs 601, a power path controller 602, supply voltages VCC and LID (e.g., 5 V), input voltages BKUP IN (e.g., from a backup battery) and +V1 (e.g., from a main battery). Further, power path controller 600 includes voltage outputs VMAX and VSUP.

According to various embodiments further disclosed below, based on voltages supplied via input voltage +V1 and input voltage BKUP IN, and possibly a designated priority (e.g., input voltage +V1 may have priority over input voltage BKUP IN), either the main battery bank or the backup battery may be coupled to a node N1. It is noted that regardless of which power source (i.e., either the main battery bank and the backup battery) is coupled to node N1, both the main battery bank and the backup battery remain coupled to a diode OR 610.

Figure 7:
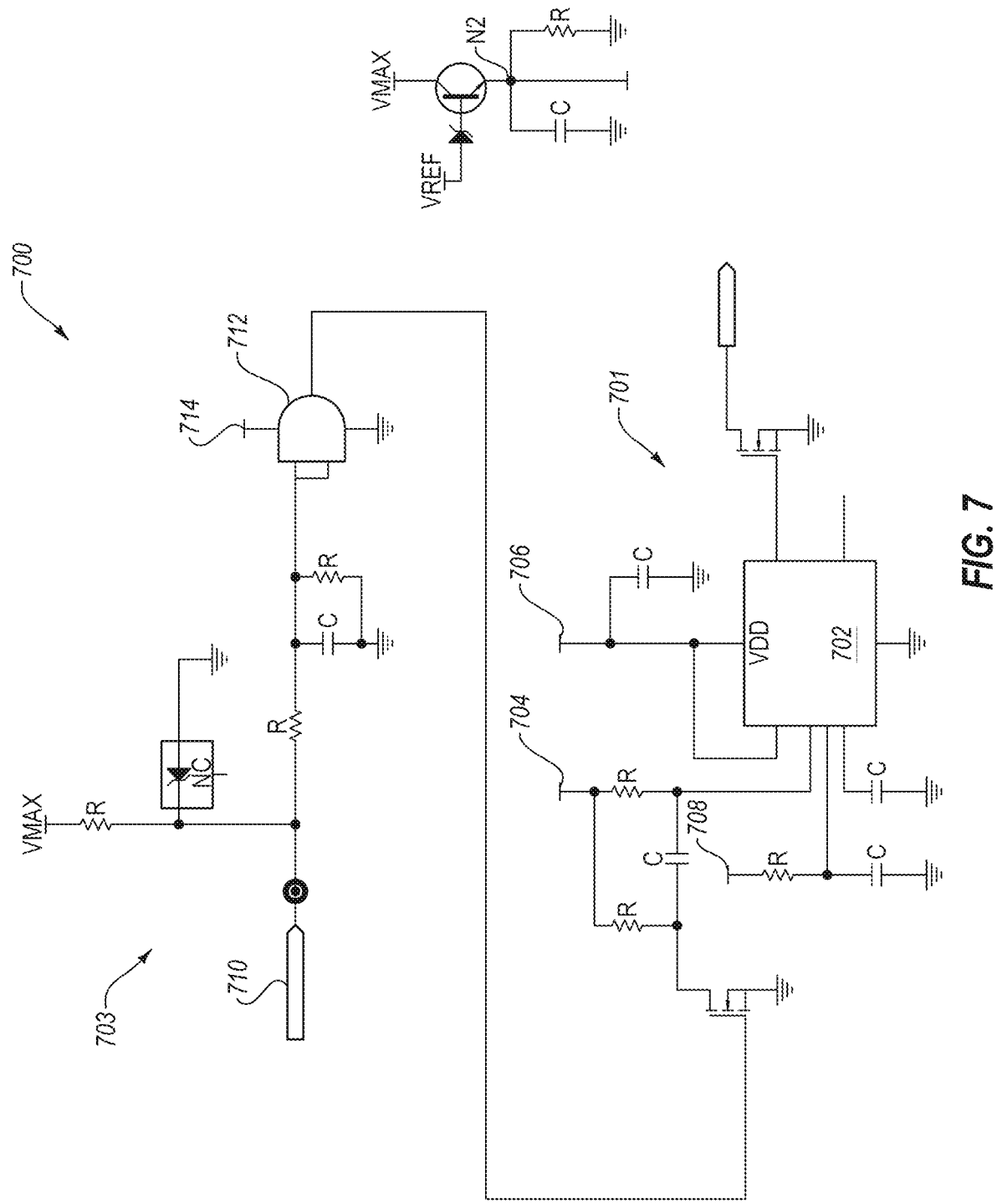
FIG. 7 is a circuit diagram of example logic, according to various embodiments of the disclosure.

FIG. 7 depicts example logic 700, according to various embodiments of the disclosure. For example, logic 700 may include edge power reset logic. For example, power reset logic 116 of FIG. 1A may include logic 700. Logic 700 includes a timer 701 (i.e., including timer circuit 702), a level shifter 703, supply voltages 704 (e.g., 3 V), 706 (e.g., 3 V), 708, (e.g., 3 V), an input voltage VMAX, and a reference voltage VREF, input 710 (e.g., coupled to an output of modem 126 of FIG. 1A), and an AND gate 712. According to some embodiments, a voltage at a node N2 may be supplied to each of supply voltages 704, 706, and 714.

It is noted that the circuits shown in FIGS. 2-7 are provided as examples only, and other suitable circuitry and/or configurations (e.g., to perform the same or similar functions) may be within the scope of the disclosure.

Figure 8:
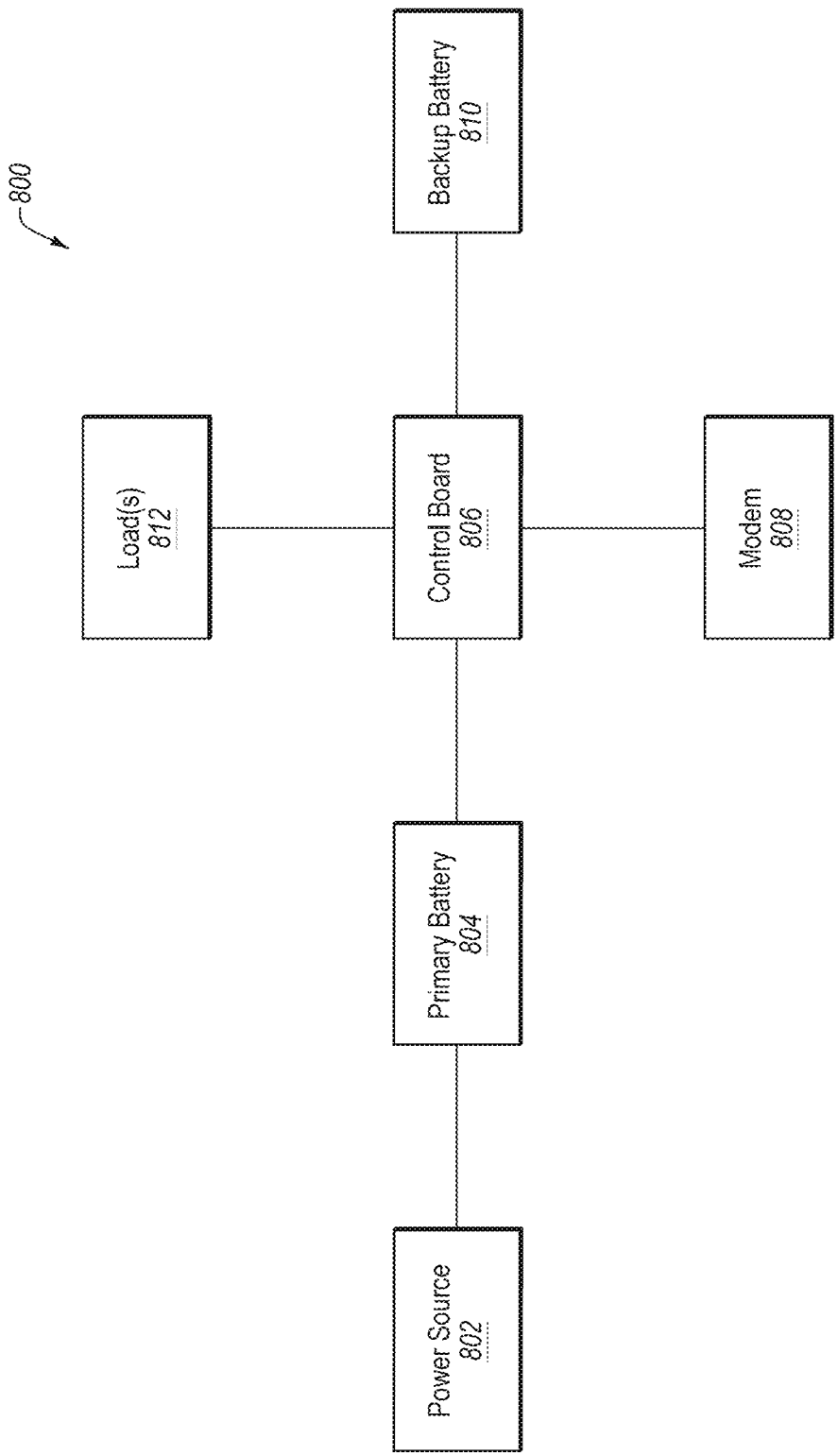
FIG. 8 is a block diagram depicting a system, in accordance with various embodiments of the disclosure.

FIG. 8 is a block diagram of an example system 800, in accordance with various embodiments of the disclosure. System 800, which may be part of a unit (e.g., a surveillance/security unit), includes a power source 802, a primary battery system 804, a control board 806, a modem 808, a backup battery system 810, and one or more loads 812. For example, a power source may include a solar power system (i.e., including one or more solar panels), a fuel-cell generator, shore power, any combination thereof, or any other known and suitable power source. Further, for example, control board 806 may include system 100A (see FIG. 1A) and/or system 100B (see FIG. 1B), described above. Backup battery system 810 may include backup battery 118 (see FIG. 1A) and modem 708 may include modem 126 (see FIG. 1A). Moreover, loads 812 may include, for example, one or more sensors (e.g., cameras, motion sensors, chemical sensors, sound detectors, or any other suitable sensor), one or more output devices (e.g., light, display, speaker, etc.), and/or any other device of a unit (e.g., mobile unit) that may use power.

With reference to FIGS. 1A-8, various contemplated operations, according to various embodiments of the disclosure, will now be described.

In one example operation, modem 126/808 may generate a signal (also referred to herein as a "reset signal") that may be received at logic 116 of system 100A/100B. Further, in response to receipt of the signal, power reset logic 116 may cause at least one component (e.g., processor 114, modem 126/808, one or more loads 812, and/or another component) to be reset (e.g., power-cycled via disconnecting the component from a power supply for a time period before recoupling the component to the power supply). For example, modem 126/808 may generate the signal responsive to receipt of another signal (e.g., a signal sent from a remote device). Further, in another operation, responsive to an event (e.g., determining that one or more components are not operating properly (e.g., based on sensing a parameter (also referred to herein as a "property," such as a current and/or a voltage associated with the one or more components))), processor 114 may send a reset signal to power reset logic 116, which may cause the one or more components to be reset (e.g., via power-cycling, as noted above). Thus, according to various embodiments, a reset operation may be an automatic operation based on a sensed state of a component, or a reset operation may be triggered from a remote device (e.g., remote personnel can cause a signal to be sent to reset a component).

More specifically, in one example, a signal generated (e.g., generated by a modem, such as modem 126 of FIGS. 1A and 1B) may be received at input 710 of level shifter 703 of FIG. 7. Responsive to receipt of the signal at input 710, a signal may be conveyed from level shifter 703 to timer 701, which may generate a pulse signal that may cause one or more power supplies to be decoupled from one or more components for a sufficient amount of time such that the one or more components may be reset.

In another example operation, power path controller 106 may (e.g., in response to an event or a status) cause power to at least some of the number of electronic devices (e.g., of a unit) to be switched from primary battery system 804 to backup battery system 810, or vice versa. For example, if batteries of primary battery system 804 run down or power from primary battery system 804 is otherwise disrupted, power path controller 106 may cause power to be supplied from backup battery system 810 to one or more electronic devices (e.g., control board 806, one or more loads 812, modem 808, and/or any other electronic device of a unit).

With reference to FIG. 6, according to various embodiments, based on voltages supplied via input voltage +V1 and input voltage BKUP IN, and possibly a designated priority of input voltages +V1 and BKUP IN (e.g., input voltage +V1 may have priority over input voltage BKUP IN), either input voltage +V1 (i.e., from the main battery bank) or input voltage BKUP IN (i.e., from the backup battery) may be coupled to a node N1. In other words, based on the operation of the circuitry of power path controller 600, one of input voltage +V1 and input voltage BKUP IN may be disconnected (i.e., via one or more switches) from node N1, and the other of input voltage +V1 and input voltage BKUP IN may be coupled to output voltage VSUP for supplying power to one or more components/electronic devices (e.g., one or more loads of a security/surveillance unit). It is noted that even if a power source (input voltage +V1 or input voltage BKUP IN) is disconnected from node N1, the power source may still be coupled to an associated diode of diode OR 610. Thus, even if one or both of input voltage +V1 and input voltage BKUP IN is/are disconnected from node N1, output voltage VMAX may still receive power from at least one of input voltage +V1 or input voltage BKUP IN.

As noted herein, a current may be supplied to backup battery 118 (i.e., to charge backup battery 118). According to another example operation, charger 120, which may receive a current from measurement unit 108, may be configured to provide a current to backup battery 118, wherein the current conveyed to backup battery 118 may be reduced compared to the current conveyed from measurement unit 108 to charger 120. For example, charger 120 may include an enable line (i.e., to turn charger 120 on or off as needed) and a charge current selection signal (i.e., to set the current amount to the desired level as conditions dictate). For example, based on various parameters/conditions (e.g., state of one or more batteries, a voltage generated via, for example, a solar power system, and/or other parameters) of a system (e.g., system 100A), current at a first level or at a second, higher level may be provided to backup battery 118. As a more specific, non-limiting example, if a voltage being supplied by a device (e.g., a solar power system) is at a sufficient level, a current at the second, higher level (e.g., 2 amps) may be supplied from charger 120 to backup battery 118. Otherwise, a current at the first level (e.g., 1 amp) may be supplied from charger 120 to backup battery 118.

Further, in yet another example operation, one or more of measurement units 122 may sense a parameter (e.g., a current and/or a voltage) associated with an associated load 812. Information regarding a sensed parameter may be provided to another component, such as processor 114, which may take one or more actions based on the information. More specifically, for example, if a parameter (e.g., current and/or a voltage) associated with a load (e.g., a camera, a light, or another electronic device) is sensed and is determined to be abnormal (e.g., based on known normal/ ideal parameters), the load may be reset (e.g., (e.g., via power reset logic 116, as described herein)) or may be disabled (e.g., turned off) until further information may be gathered. In one example, in response to the abnormal parameter sensing, processor 114 may cause an alert or other message to be sent (e.g., to personnel/user and/or to a remote location (e.g., cloud server)).

Figure 9:
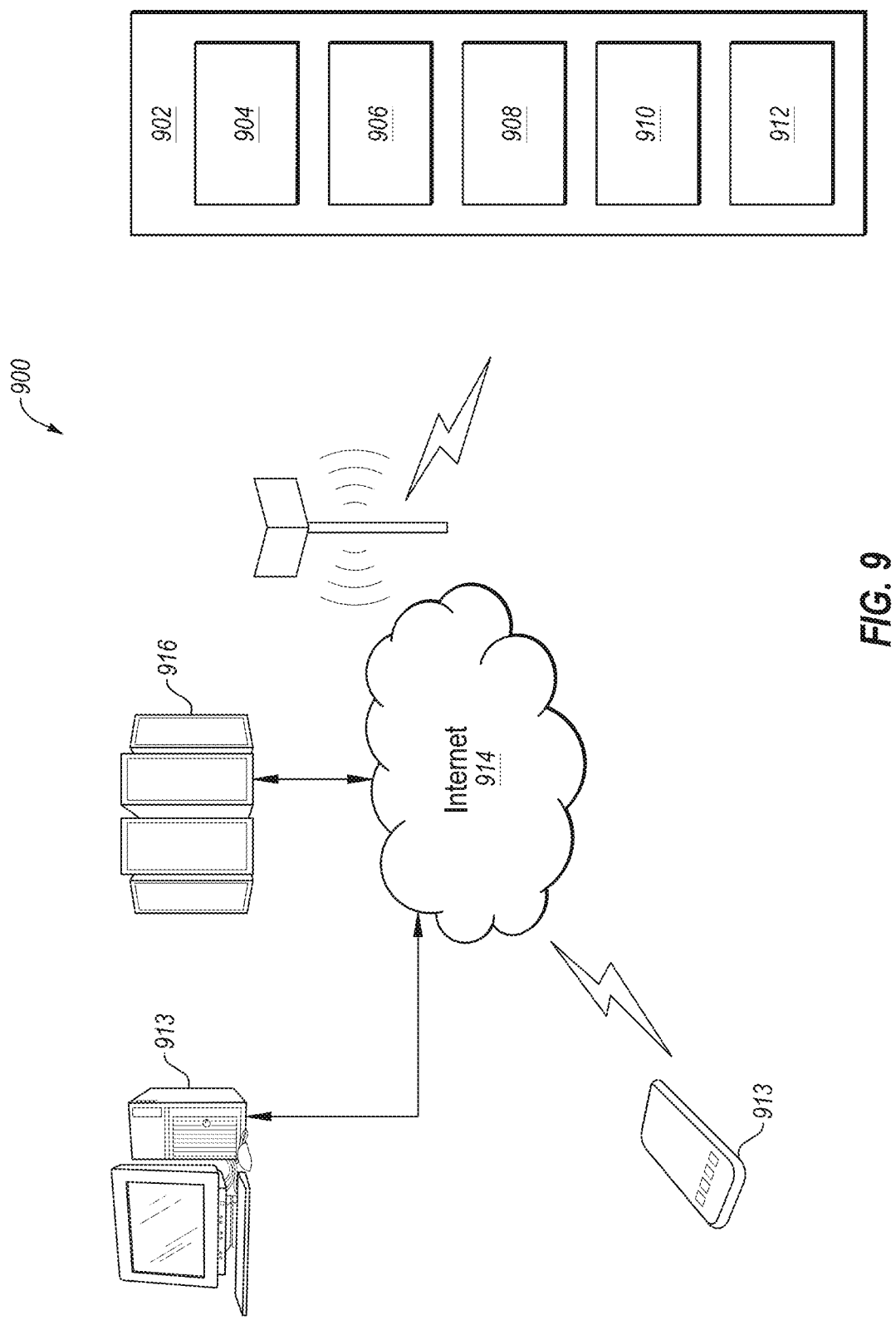
FIG. 9 depicts an example system including a mobile unit, in accordance with various embodiments of the disclosure.

FIG. 9 illustrates a system 900, according to one or more embodiments of the disclosure. System 900, which may include a security and/or surveillance system, includes a unit 902, which may also be referred to herein as a "mobile unit," a "mobile security unit," a "mobile surveillance unit," a "physical unit," or some variation thereof. According to various embodiments, unit 902 may include one or more sensors (e.g., cameras, weather sensors, motion sensors, noise sensors, chemical sensors, without limitation) 904 and one or more output devices 906 (e.g., lights, speakers, electronic displays, without limitation). For example only, sensors 904 may include one or more cameras, such as thermal cameras, infrared cameras, optical cameras, PTZ cameras, bi-spectrum cameras, any other camera, or any combination thereof. Further, for example only, output devices 906 may include one or more lights (e.g., flood lights, strobe lights (e.g., LED strobe lights), and/or other lights), one or more speakers (e.g., two-way public address (PA) speaker systems), any other suitable output device (e.g., a digital display), or any combination thereof.

In some embodiments, unit 902 may also include one or more storage devices 908. Storage device 908, which may include any suitable storage device (e.g., a memory card, hard drive, a digital video recorder (DVR)/network video recorder (NVR), internal flash media, a network attached storage device, or any other suitable electronic storage device), may be configured for receiving and storing data (e.g., video, images, and/or i-frames) captured by sensors 904. In some embodiments, during operation of unit 902, storage device 908 may continuously record data (e.g., video, images, i-frames, and/or other data) captured by one or more sensors 904 (e.g., cameras, lidar, radar, environmental sensors, acoustic sensors, without limitation) of unit 902 (e.g., 24 hours a day, 7 days a week, or any other schedule).

Unit 902 may further include a computer 910, which may include memory and/or any suitable processor, controller, logic, and/or other processor-based device known in the art. Moreover, although not shown in FIG. 9, unit 902 may include one or more additional devices including, but not limited to, one or more microphones, one or more solar panels, one or more power generators (e.g., fuel cell generators), or any combination thereof. Unit 902 may also include a communication device (e.g., a modem (e.g., a cellular modem, a satellite modem, a Wi-Fi modem, etc.)) 912 that may comprise any suitable and known communication device, which may be coupled to sensors 904, output devices 906, storage device 908, and/or computer 910 via wired connections, wireless connections, or a combination thereof. In some embodiments, communication device 912 may include one or more radios and/or one or more antennas.

System 900 may further include one or more electronic devices 913, which may comprise, for example only, a mobile device (e.g., mobile phone, tablet, etc.), a desktop computer, or any other suitable electronic device including a display. Electronic device 913 may be accessible to one or more end-users. Additionally, system 900 may include a server 916 (e.g., a cloud server or any other server), which may be remote from unit 902. Communication device 912, electronic devices 913, and server 916 may be coupled to one another via the Internet 914.

According to various embodiments of the disclosure, unit 902 may be within a first location (a "camera location" or a "unit location"), and server 916 may be within a second location, remote from the first location. In addition, each electronic device 913 may or may not be remote from unit 902 and/or server 916. As will be appreciated by a person having ordinary skill in the art, system 900 may be modular, expandable, and/or scalable.

As noted above, in some embodiments, unit 902 may include a mobile unit (e.g., a mobile security/surveillance unit). In these and other embodiments, unit 902 may include a portable trailer (not shown in FIG. 9), a storage box (e.g., including one or more batteries) (not shown in FIG. 9), and a mast (not shown in FIG. 9) coupled to a head unit (e.g., including, for example, one or more cameras, one or more lights, one or more speakers, and/or one or more microphones) (not shown in FIG. 9). According to various examples, in addition to sensors and output devices, a head unit of unit 902 may include and/or be coupled to storage device 908, computer 910, and/or communication device 912.

For example, system 900 may include at least a portion of system 100A of FIG. 1A and/or system 100B of FIG. 1B. As a more specific example, a control board (e.g., a circuit board) of unit 902 may include system 100A of FIG. 1A and/or system 100B of FIG. 1B. More specifically, for example, computer 910 may include and/or may be part of system 100A of FIG. 1A and/or system 100B of FIG. 1B.

Figure 10:
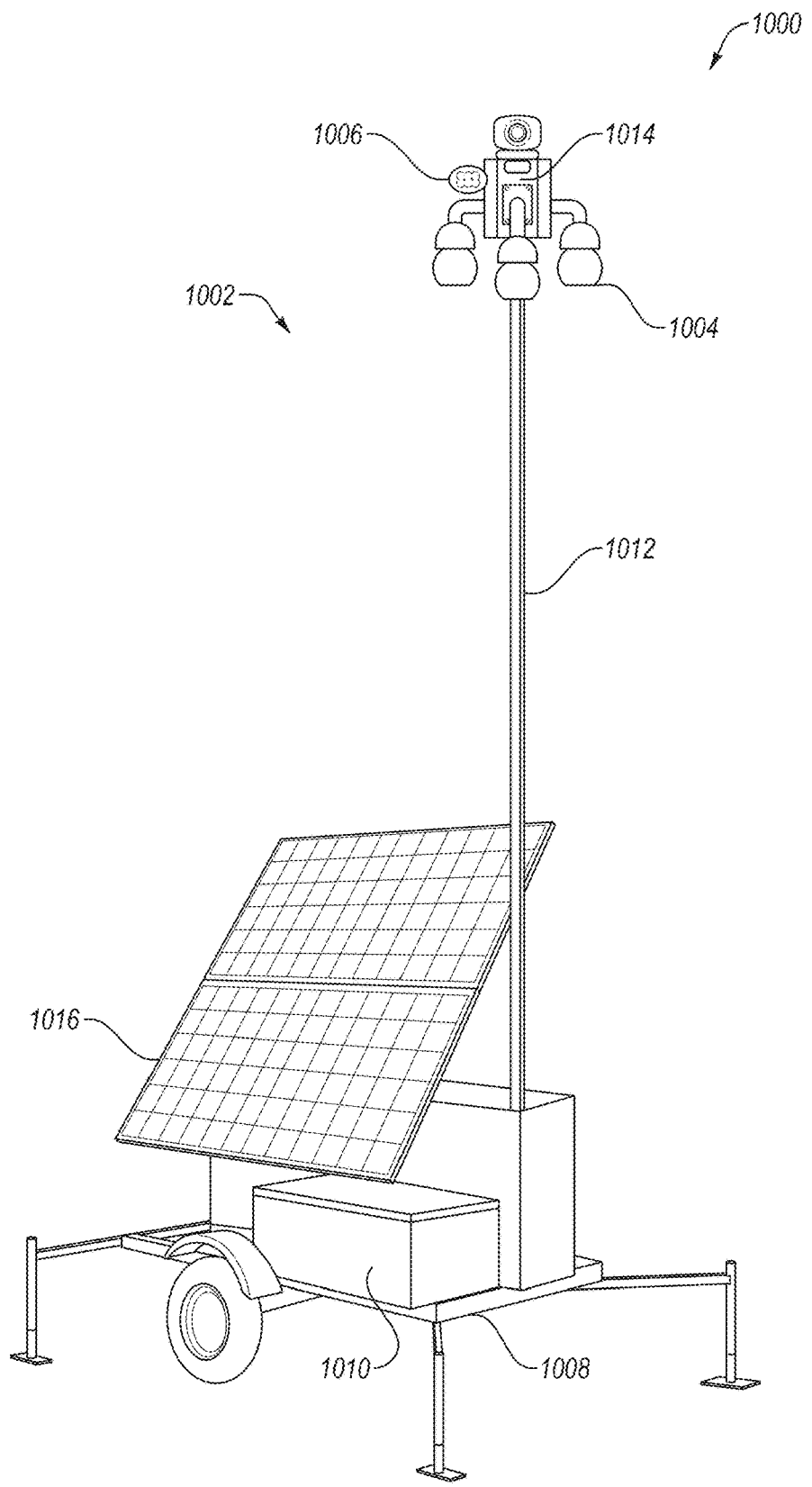
FIG. 10 depicts an example system including a mobile unit, a server, and one or more devices, in accordance with various embodiments of the disclosure.

FIG. 10 depicts another example system 1000 including a unit 1002, in accordance with various embodiments of the disclosure. Unit 1002, which may also be referred to herein as a "mobile unit," a "mobile security unit," a "live unit," or a "physical unit," may be configured to be positioned in an environment (e.g., a parking lot, a roadside location, a construction zone, a concert venue, a sporting venue, a school campus, without limitation). In some embodiments, unit 1002 may include one or more sensors (e.g., cameras, weather sensors, motion sensors, noise sensors, without limitation) 1004 and one or more output devices 1006 (e.g., lights, speakers, electronic displays, without limitation). Unit 1002 may also include at least one storage device (e.g., internal flash media, a network attached storage device, or any other suitable electronic storage device), which may be configured for receiving and storing data (e.g., video, images, audio, without limitation) captured by one or more sensors of unit 1002.

In some embodiments, unit 1002 may include a mobile security unit (also referred to herein as a mobile surveillance unit). In these and other embodiments, unit 1002 may include a portable trailer 1008, a storage box 1010, and a mast 1012 coupled to a head unit 1014 which may include for example, one or more batteries, one or more cameras, one or more lights, one or more speakers, and/or one or more microphones. According to some embodiments, a first end of mast 1012 may be proximate storage box 1010 and a second, opposite end of mast 1012 may be proximate, and possibly adjacent, head unit 1014. More specifically, in some embodiments, head unit 1014 may be coupled to mast 1012 an end opposite an end of mast 1012 proximate storage box 1010.

In some examples, unit 1002 may include one or more primary batteries (e.g., within storage box 1010) and one or more secondary batteries (e.g., within head unit 1014). In these embodiments, a primary battery positioned in storage box 1010 may be coupled to a load and/or a secondary battery positioned within head unit 1014 via, for example, a cord reel.

In some embodiments, unit 1002 may also include one or more solar panels 1016, which may provide power to one or more batteries of unit 1002. More specifically, according to some embodiments, one or more solar panels 1016 may provide power to a primary battery within storage box 1010. Although not illustrated in FIG. 10, unit 1002 may also include one or more additional power sources, such as one or more generators (e.g., fuel cell generators), which may or may not be positioned within storage box 1010.

For example, system 1000 may include at least a portion of system 100A of FIG. 1A and/or system 100B of FIG. 1B. As a more specific example, a control board (e.g., a circuit board) of head unit 1014 may include system 100A of FIG. 1A and/or system 100B of FIG. 1B. In these and other embodiments, the control board may be coupled to a number of devices of system 1000, such as one or more primary batteries (e.g., primary battery system 804 within storage box 1010), one or more secondary batteries (e.g., backup battery system 810 within head unit 1014), one or more sensors 1004, one or more output devices 1006, one or more power sources (e.g., solar panels 1016), any combination thereof, without limitation.

Figure 11:
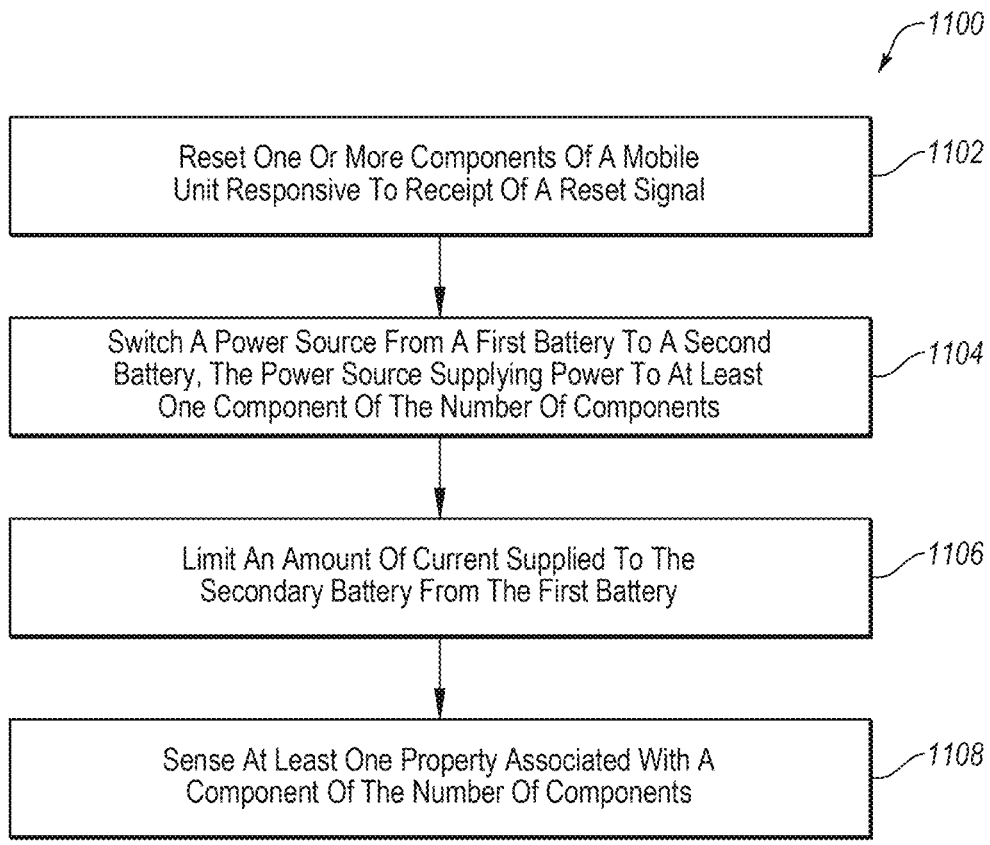
FIG. 11 is a flowchart illustrating an example method of rebooting a controller of a mobile unit, according to various embodiments of the disclosure.

FIG. 11 is a flowchart of an example method 1100 of operating a unit, which may be a security and/or surveillance unit (e.g., positioned in a remote location). Method 1100 may be arranged in accordance with at least one embodiment described in the disclosure. Method 1100 may be performed, in some embodiments, by a device or system, such as system 100A and/or 100B (see FIGS. 1A and/or 1B), system 800 (see FIG. 8), or another device or system. Although illustrated as discrete blocks, various blocks may be divided into additional blocks, combined into fewer blocks, or eliminated, depending on the desired implementation.

Method 1100 may begin at block 1102, wherein, responsive to receipt of a reset signal (e.g., at a circuit of a control board), one or more components (e.g., a processor, a load, and/or a modem) of a unit (e.g., a surveillance/security unit) is reset, and method 1100 may proceed to block 1104. For example, in response to a signal conveyed from modem 126, processor 114, a load (e.g., I/O device), and/or modem 126 is reset via, for example, power reset logic 116 of FIG. 1. For example, a signal sent from a remote device (e.g., remote from the unit) may be received at modem 126, and responsive thereto, modem 126 may convey a signal to power reset logic 116, which may cause one or more components of the unit to be reset.

At block 1104, power to at least one of a number of electronic devices may be switched from one power source (e.g., a primary power source) to another power source (e.g., a backup power source), and method 1100 may proceed to block 1106. For example, responsive to some event (e.g., when primary power is interrupted), power path controller 106 may cause a power source (i.e., supplied to a device, such as a load) to be switched from one source (e.g., a battery of primary battery system 804) to another source (e.g., backup battery 118/810), or vice versa.

At block 1106, an amount of current conveyed to a battery may be limited, and method 1100 may proceed to block 1108. For example, charger 120 (see FIGS. 1A and 1B) may limit an amount of current conveyed from a device (e.g., a primary battery) to backup battery 118.

At block 1108, a property (also referred to herein as a "parameter") associated with a load may be sensed. For example, a current and/or a voltage associated with the load may be sensed via an associated measurement unit 122 (see FIGS. 1A and 1B).

Modifications, additions, or omissions may be made to method 1100 without departing from the scope of the present disclosure. For example, the operations of method 1100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, method 1100 may include one or more acts wherein an action is taken responsive to the sensed property of a load, as indicated in block 1108.

In accordance with common practice, the various features illustrated in the drawings may not be drawn to scale. The illustrations presented in the disclosure are not meant to be actual views of any particular apparatus (e.g., circuit, device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., circuit, device, or system) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

As used herein, the term "approximately" or the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, the term "approximately" or the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed:

1. A mobile unit, comprising:
a number of batteries including at least a first battery and a second battery;
a number of electronic devices; and
a circuit board including at least one of:
power reset logic configured to reset at least one electronic device of the number of electronic devices;
a power switch-over circuit configured to switch power to one or more of the number of electronic devices from the first battery to the second battery; and
a charge controller coupled configured to limit an amount of current conveyed to the second battery.

2. The mobile unit of claim 1, further comprising at least one renewable energy source coupled to the at least one of the first battery or the second battery.

3. The mobile unit of claim 1, the circuit board further comprising a number of measurement devices, each electronic device of the number of electronic devices coupled to a measurement device of the number of measurement devices.

4. The mobile unit of claim 3, wherein each measurement device is configured to report at least one measurement associated with a corresponding electronic device.

5. The mobile unit of claim 4, wherein the at least one measurement comprises a voltage, a current, or both.

6. The mobile unit of claim 1, further comprising:
a head unit including the number of electronic devices and housing the circuit board;
a mast having one end attached to the head unit; and
a trailer attached to a second, opposite end of the mast.

7. The mobile unit of claim 1, wherein the power reset logic resets the at least one electronic device responsive to receipt of a control signal.

8. The mobile unit of claim 1, wherein the power switch-over circuit is configured to send a control signal to the power reset logic.

9. A mobile device, comprising:
a circuit board for coupling to a number of loads, the circuit board including:
power reset logic configured to reset at least one load of the number of loads;
a power switch-over unit configured to select one of a first power source or a second power source for providing power to the number of loads; and
a number of measurement devices, each load of the number of loads coupled to a measurement device of the number of measurement devices.

10. The mobile device of claim 9, the circuit board further comprising a charge controller to enable at least one of the first power source or the second power source to be charged at one of two possible current levels.

11. The mobile device of claim 10, wherein the charge controller is configured to limit the amount of current conveyed to at least one of the first power source or the second power source.

12. The mobile device of claim 9, the circuit board further a number of switches, each switch of the number of switches coupled to: an output of an associated measurement device of the number of measurement devices; and an associated load of the number of loads.

13. The mobile device of claim 9, the circuit board further comprising:
a power input connector; and
a reverse polarity protection circuit coupled between the power input connector and the power switch-over unit.

14. The mobile device of claim 9, further comprising the first power source and the second power source, one of the first power source or the second power source comprising a backup battery.

15. The mobile device of claim 9, wherein each measurement device of the number of measurement devices is configured to sense at least one of a voltage or a current associated with a corresponding load of the number of loads.

16. The mobile device of claim 9, further comprising a modem configured to convey a signal to the power reset logic to reset the at least one load.

17. A mobile unit, comprising:
a number of loads; and
circuitry including:
power reset logic to reset at least one of the number of loads; and
a power switch-over circuit configured to switch power to at least some of the number of loads from a first battery to a second battery or vice versa.

18. The mobile unit of claim 17, further comprising a charge controller to limit an amount of current conveyed to at least one of the first battery or the second battery.

19. The mobile unit of claim 17, the circuitry further comprising a number of measurement devices configured for measuring at least one parameter associated with the number of loads.

20. The mobile unit of claim 19, wherein at least one measurement device of the number of measurement devices is configured to report at least one measurement associated with a corresponding load.

* * * * *